No. 773,593. PATENTED NOV. 1, 1904.
H. RIENSCH.
DEVICE FOR THE PURIFICATION OF WASTE LIQUORS.
APPLICATION FILED MAR. 4, 1902.
NO MODEL.
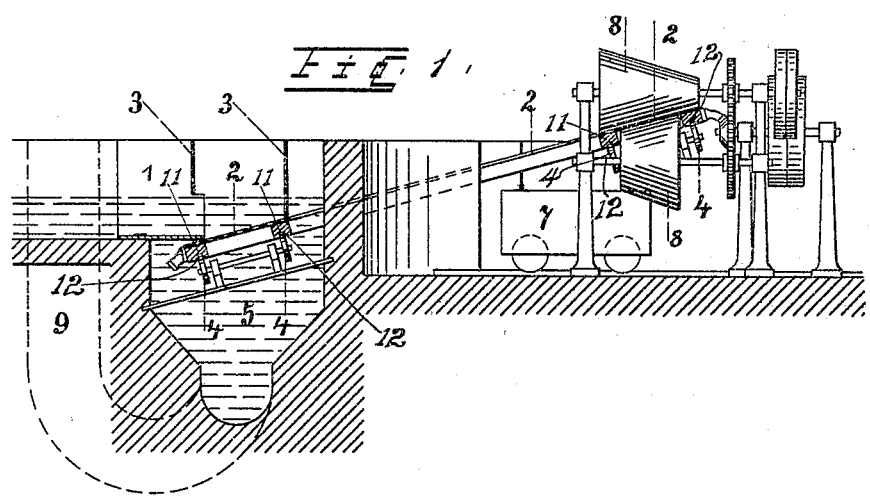
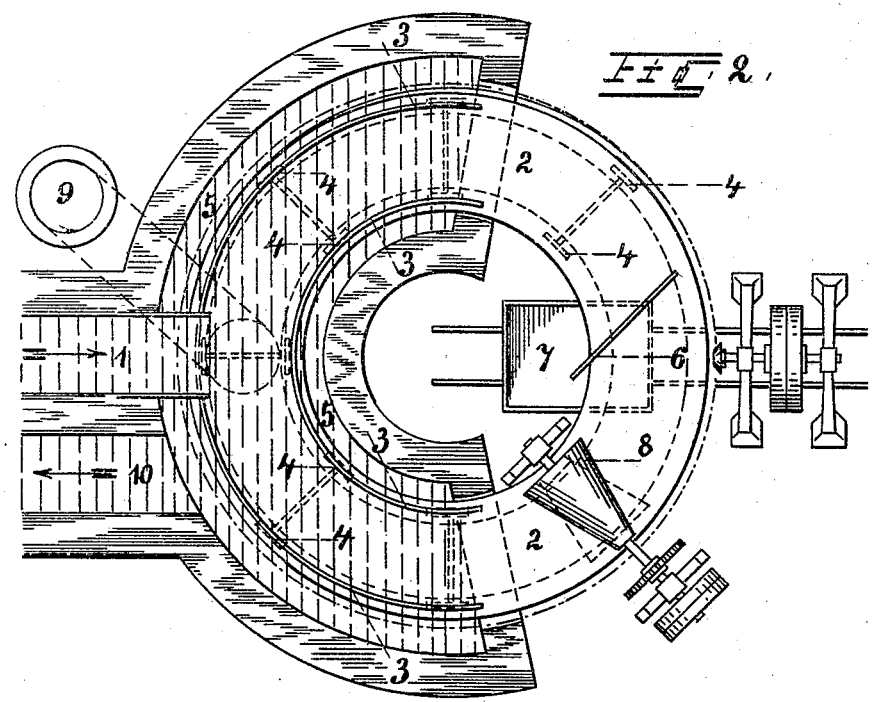

No. 773,593.

Patented November 1, 1904.

UNITED STATES PATENT OFFICE.

HERMANN RIENSCH, OF CHARLOTTENBURG, GERMANY.

DEVICE FOR THE PURIFICATION OF WASTE LIQUORS.

SPECIFICATION forming part of Letters Patent No. 773,593, dated November 1, 1904.

Application filed March 4, 1902. Serial No. 96,580. (No model.)

*To all whom it may concern:*

Be it known that I, HERMANN RIENSCH, civil engineer, a subject of the King of Prussia, Emperor of Germany, residing at 12 Friedrich-Carl Platz, in the city of Charlottenburg, near Berlin, Kingdom of Prussia, German Empire, have invented a certain new and useful Device for the Purification of Waste Liquors, of which the following is a specification.

The object of my invention is to provide a cheap and easily-operated device for purifying waste liquors of various sorts; and it consists in substance of a perforated inclined plate upon which the waste liquor is allowed to flow, in combination with stationary side walls, with scraping means, and means for rotating such plate, whereby the residues or deposits which are separated out from the liquid are caught and are removed at an easily-accessible place from the said rotating perforated plate.

Such invention is fully shown and described in the following specification, of which the accompanying drawings form a part, wherein similar numerals of reference designate like or equivalent parts wherever found throughout the several views, and in which—

Figure 1 is a view in vertical longitudinal section of my improved apparatus for purifying waste liquors, and Fig. 2 is a top plan view thereof.

The waste or spent liquor, sewage, or the like is introduced into the drain 1, where it enters the apparatus and drops upon the perforated inclined plate 2, of circular and usually, also, annular shape, to which a rotating motion is imparted.

The reference-numeral 3 designates stationary side walls so arranged as to flank that part of the rotary annular plate 2 which dips into the tank 5, while the other higher part of the plate is unflanked at all sides.

The numeral 4 designates rollers or wheels on which the movable plate is rotated.

In order to hold the annular plate 2 firmly in position and yet at the same time allow the same to freely rotate, such plate is usually provided on its inner and outer edges on the under side with an annular rail or guide-ring 11, each of which is provided with a central groove 12, into which fits the adjacent wheels 4, and by this arrangement the plate is kept as firmly in position while being rotated as though mounted upon an axle.

At the highest freely-accessible point of the perforated plate 2 I provide a scraper 6, which is so arranged that the solid elements removed from the liquid are directly transferred thereby to the truck or car 7, which transference is greatly facilitated by the downwardly-inclined surface of the plate 2. At the rear of the scraper 6 the perforations of the plate 2 are cleaned, and preferably from below and from above at the same time, by means of rotary brushes 8.

The sludge and sand which accumulate at the lowest point of the tank 5 may be removed by a suitable pipe or it may be drained off by a pump through the pipe 9. In some cases these deposits may be allowed to remain in the purified water—as, for instance, in sugar factories—and in such cases a pipe or passage 10 may be used for draining the apparatus. The requisite pressure may be obtained by the difference of level of the entrance and delivery openings.

What I claim, and desire to secure by Letters Patent, is—

1. A device for the purification of waste liquors by mechanical means comprising the combination with a suitable tank of an inclined perforated plate the lower part of which dips into the said tank, stationary side walls in the tank adjacent to the plate, and means to impart a rotary movement to said plate, the higher part of said plate being exposed.

2. In combination in a device for the purification of waste liquors, a tank, an inclined rotating plate part of which dips into said tank, the higher part of said plate being exposed, and a suitable scraping device in connection with said higher part for the removal of solid deposits and for transferring the same to a suitable transporting device.

3. In combination with a device for the purification of waste liquors, a tank, an inclined rotating perforated plate the higher part of which is exposed, and rotary brushes at said higher part for the purpose of cleaning the openings of the said plate from above and from below, substantially as described.

4. A device for the purification of waste liquors by mechanical means comprising the combination with a suitable tank, of an inclined circular annular perforated plate the lower part of which dips into the said tank, stationary side walls in the tank adjacent to the plate, and means to impart a rotary movement to said plate.

5. In a device for the purification of waste liquors, a tank, an inclined annular rotating plate the lower part of which dips into the tank and the higher part of which is exposed, and a suitable scraping device in connection with said higher part of the plate for the removal of solid deposits and for transferring the same to a suitable transportation device.

6. In a device for the purification of waste liquors, a tank, an inclined annular rotating perforated plate the higher part of which is exposed, and rotary brushes at said higher part for the purpose of cleaning the openings of the said plate from above and from below, substantially as described.

In witness whereof I have hereunto set my hand in presence of two witnesses.

HERMANN RIENSCH.

Witnesses:
RICHARD GUENTHER,
CARL GRUND.